United States Patent [19]
Hoshino et al.

[11] Patent Number: 6,139,894
[45] Date of Patent: *Oct. 31, 2000

[54] FLOUR BLENDS FOR DEEP FRIED FOODS, STEAMED CHINESE MANJU, DOUGH SHEETS, OKONOMI-YAKI, AND TAKOYAKI

[75] Inventors: Tsuguhiro Hoshino, Fukuyama; Ryo Yoshikawa, Morioka; Seiji Ito, Takada; Koichi Hatta; Toshiki Nakamura, both of Morioka; Makoto Yamamori, Tsukuba; Hideyuki Miyamura, Saitama; Yuki Murayama, Saitama; Yoshiko Kawamura, Saitama; Katsuyuki Hayakawa, Saitama; Keiko Tanaka, Saitama; Seiji Tago, Tokyo; Shinji Ishigami, Tokyo; Masakazu Mizukami, Tokyo; Yasuhiro Tanaka, Tokyo, all of Japan

[73] Assignees: Ministry of Agriculture, Forestry, and Fisheries, Tohoku; National Agricultural Experiment Station, Iwate; Nisshin Flour Milling Co., Ltd., Tokyo, all of Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/916,703

[22] Filed: Aug. 25, 1997

[30] Foreign Application Priority Data

Aug. 28, 1996 [JP] Japan .................................... 8-226940
Aug. 28, 1996 [JP] Japan .................................... 8-226941
Aug. 28, 1996 [JP] Japan .................................... 8-226942
Aug. 28, 1996 [JP] Japan .................................... 8-226943

[51] Int. Cl.$^7$ .................................................. A21D 10/00
[52] U.S. Cl. ........................... 426/549; 426/94; 426/275; 426/283; 426/496; 426/622
[58] Field of Search .................................... 426/549, 622, 426/554, 451, 557, 94, 496, 275, 283

[56] References Cited

FOREIGN PATENT DOCUMENTS 5-292871  11/1993  Japan .
5-316932  12/1993  Japan .
6-125669   5/1994  Japan .

OTHER PUBLICATIONS

Yamamori et al. Production of a waxy wheat by genetically eliminating wx protein, Jul. 1994.
Nakamura et al."Production of waxy wheats" Molecular Gene Genetic 248, pp. 253–259, 1995.
Professional Baking, pp. 12–13, 1985.

*Primary Examiner*—Lien Tran
*Attorney, Agent, or Firm*—Sughrue, Mion, Zinn, Macpeak & Seas, PLLC

[57] ABSTRACT

Flour blends which contain waxy wheat flour and which are suitable for the preparation of deep fried foods, steamed Chinese manju, dough sheets, okonomi-yaki, and takoyaki are described. These flour blends make it possible to obtain foods which have excellent texture and flavor when consumed immediately after preparation or after being heated or thawed.

22 Claims, No Drawings

FLOUR BLENDS FOR DEEP FRIED FOODS, STEAMED CHINESE MANJU, DOUGH SHEETS, OKONOMI-YAKI, AND TAKOYAKI

TECHNICAL FIELD

The present invention relates to a novel flour blend for deep fried foods, steamed Chinese manju (dumpling-like food filled with bean jam, etc.), dough sheets, okonomi-yaki (a pancake-like dish containing meat, seafood, vegetable and any of a variety of ingredients etc.), and takoyaki (a dumpling-like dish containing octopus). The invention also relates to foods with excellent texture prepared from the flour blends, in particular, deep fried foods, steamed Chinese manju, dough sheets, okonomi-yaki, and takoyaki, which provide excellent texture even when they are consumed after being stored in a refrigerator or thawed after being frozen.

BACKGROUND OF THE INVENTION

Deep fried foods (hereinafter referred to as "deep frieds") are prepared by coating vegetables, meat, fish, shellfish, etc. with batter containing wheat flour, salt, baking powder, a variety of flavorings, spices, water, and so on, and deep frying in fat or oil. Typical deep frieds are fritters and tempura.

The wheat flour used as a principal ingredient of deep frieds is soft wheat flour obtained from soft wheat having a low protein content, such as Western White Wheat produced in the U.S.A.

However, when deep frieds are prepared by use of soft flour, there are noted the following disadvantages. The amount of coating is insufficient due to the low viscosity of the batter. In addition, if the deep frieds are frozen for storage purposes and then thawed in a microwave oven, the soft but crispy texture inherent to deep frieds is lost, and disagreeable gum-like texture.

Regarding the former problem, i.e., insufficient coating, a solution has been proposed by Japanese Patent Application Laid-Open (kokai) No. 62-14756, which discloses the use of oil/fat-treated starch prepared by adding edible oils or fats to waxy cornstarch or waxy rice starch, to thereby raise the viscosity above a certain level. However, this method is not effective for improving the texture of deep frieds after they are thawed in a microwave oven.

In order to improve the texture of deep frieds after they are thawed, Japanese Patent Application Laid-Open (kokai) No. 6-253763 discloses the use of a specific flour which contains protein powder, pulverized malt syrup, fatty acid esters, and rice powder or potato starch powder. However, satisfactory results have not yet obtained from this method.

Steamed Chinese manju are food similar to dumplings, and prepared by wrapping a filling such as sweat bean jam in a dough and then steaming. The dough is generally prepared by adding sugar, oils and fats, yeast, synthetic baking powder, emulsifiers, gelling agents, food colors, etc. to a flour blend primarily containing wheat flour—for example, a combination of soft wheat flour and hard wheat flour, a combination of semi-hard wheat flour and hard wheat flour, or a sole use of semi-hard wheat flour—and optionally including rice flour, starch, etc.

Recently, steamed Chinese manju which are produced in a factory are often stored and distributed under refrigerated conditions or in a frozen state. However, when steamed Chinese manju are cooled or frozen, they often become hard due to retrogradation of gelatinized starch. Therefore, Chinese manju that have been stored in a refrigerator or in a frozen state must be sufficiently heated before consumption so as to re-gelatinize the retrograded starch. Generally speaking, starch contained in Chinese manju is regelatinized by the application of steam for a suitable time (about 10 minutes), to thereby restore the Chinese manju to the pre-cooled or prefrozen state.

These days, microwave ovens have rapidly become popular due to their convenience and high level of safety. They are now considered indispensable cooking appliances for home use. Therefore, it is desired that steamed Chinese manju that have been stored in a refrigerator or a freezer can be cooked by the application of heat in a microwave oven.

However, compared with the reheated manju cooked in a conventional steamer, the one reheated in a microwave oven have a hard and gummy texture.

This phenomenon is considered to be attributed to the unique mechanism of microwave ovens: heat is applied to Chinese manju from inside thereof and cooking is completed within a short period of time. Also, when heated Chinese manju are left to stand for a while, moisture on the surface easily evaporates.

As a measure to solve these problems, recent approaches to improve texture often include addition of starch, sugar, oils and fats, emulsifiers, gelling agents, etc.

However, even when these additives are incorporated, Chinese manju obtained by cooking in a microwave oven still have gummy and hard texture as compared to steamed Chinese manju reheated with a steamer. In addition, the former Chinese manju often provide disagreeable taste and flavor.

In the meantime, it is accepted that hardening of a Chinese manju dough upon gelatinization is partly due to retrogradation of gelatinated starch. Starch is composed of linear amylose and amylopectin, wherein glucose units are linked by $\alpha$1–4 linkages, but the latter also contains some branching $\alpha$1–6 bonds. Retrogradation of amylose is more remarkable than that of amylopectin. Starch that contains only very small amounts of amylose is called waxy starch. Attempts to solve tough texture due to storage in a refrigerator or a freezer or hardening of Chinese manju as a result of microwave cooking have involved the addition to Chinese manju dough of waxy rice flour, waxy rice starch, waxy corn flour, or waxy cornstarch. However, such attempts have not yet produced satisfactory results. In addition, taste and flavor are sometimes dissatisfied.

Generally speaking, gyoza and shumai are prepared by wrapping a filling (meat, vegetables, etc.) in dough sheets such as a pasta wrapping for a chinese meat dumpling (gyoza) and for a steamed meat dumpling (shumai), and then steaming. The dough sheets are prepared by adding, as required, salt, emulsifiers, vegetable oils, gelling agents, food colors, etc., to a flour blend primarily containing wheat flour which optionally includes rice flour, starch, etc.

Recently, these types of foods, i.e., dough-wrapped foods, which are produced in a factory are often stored and distributed under refrigerated conditions or in a frozen state.

However, when dough-wrapped foods are cooled in a refrigerator or a frozen, and then reheated, they often have a disagreeable tough texture. Particularly, dough-wrapped foods whose starch has once been gelatinized by the application of heat come to have significantly hard edge portions.

Therefore, in order to prevent the texture from becoming tough, and in particular to maintain soft texture of edge portions, addition of starch, sugar, oils and fats, emulsifiers, etc. has been a common practice.

However, even when these additives are incorporated, not only are their effects insufficient, but also disagreeable taste and flavor often result.

It has been accepted that hardening of a dough-wrapped foods upon gelatinization is partly due to retrogradation of gelatinized starch. Starch is composed of linear amylose and amylopectin, wherein glucose units are linked by α1–4 linkages, but the latter also contains some branching α1–6 bonds. Retrogradation of amylose is more remarkable than that of amylopectin. Starch that contains only very small amounts of amylose is called waxy starch. Attempts to solve tough texture caused by storage in a refrigerator or a freezer have involved the addition of waxy rice flour, waxy rice starch, waxy corn flour, or waxy cornstarch to the dough sheets. However, such attempts have not yet produced satisfactory results in their taste and flavor.

Okonomiyaki are foods prepared by adding salt, a variety of flavors, dashi-jiru (soup stock), egg, water, meat, seafood, vegetable, etc. to wheat flour, stirring the resultant mixture, and then baking. Takoyaki are similarly prepared with the exception that pieces of octopus are added to batter and the octopus-containing batter is baked in a special pan so as to produce a number of ball-shaped takoyaki at one time.

As the wheat flour used as principal ingredient of okonomiyaki and takoyaki, there are employed soft wheat flour obtained from soft wheat having a low protein content, such as Western White Wheat produced in the U.S.A., and semi-hard wheat flour which contains domestic Japanese wheat flour.

However, since okonomiyaki and takoyaki prepared from these types of wheat yield a batter of low viscosity, the volume of the foods after baking is not satisfactory, and resistance to the teeth is too weak, leaving the eater with an unsatisfied feeling.

Conventional attempts to solve these problems have involved the addition of polysaccharides or modified starches as viscosity-increasing agents or texture improvers. However, these approaches do not provide sufficient viscosity-increasing effects, and do not achieve, to a satisfactory level, improvement of texture of okonomiyaki and takoyaki. In addition, there is a disadvantage that texture is impeded. Japanese Patent Application Laid-Open (kokai) No. 6-303947 discloses a method for preparing takoyaki by heating batter so as to provide a proper viscosity, dividing the batter, and then baking. This method includes an intricate procedure of heating the batter and adjusting the viscosity to a proper level. Moreover, the texture and taste are not satisfactory.

These days, okonomiyaki and takoyaki are sometimes stored in a refrigerator or a freezer, and when consumed they are heated in a microwave oven. In this case, there is a problem that texture of reheated okonomiyaki and takoyaki significantly deteriorates.

Accordingly, an object of the present invention is to provide deep frieds, steamed Chinese manju, dough sheets, okonomiyaki, and takoyaki, which provide excellent texture and taste not only immediately after preparation, but also after storage in a refrigerator or a freezer and then heating and thawing in a microwave oven, etc.

DISCLOSURE OF THE INVENTION

The present inventors carried out careful studies in an attempt to solve the above-described drawbacks, and found that use of a flour blend containing waxy wheat flour provides deep frieds, steamed Chinese manju, dough-sheet-wrapped foods, okonomi-yaki, and takoyaki which meet the aforementioned object of the present invention. The present invention was accomplished based on this finding.

Accordingly, the present invention provides a flour blend for deep frieds, steamed Chinese manju, dough sheets, okonomi-yaki, and takoyaki, which flour blend contains waxy wheat flour.

The present invention also provides foods selected from deep frieds, steamed Chinese manju, dough-sheet-wrapped foods, okonomi-yaki, and takoyaki, which foods are prepared by use of a flour blend containing waxy wheat flour.

The above-mentioned foods prepared from the flour blend of the present invention have excellent texture and flavor immediately after preparation, and also have excellent texture when they are stored in a refrigerator or a freezer and then heated or thawed.

More specifically, when the flour blend of the present invention is used to prepare deep frieds, viscosity of the batter can be raised, so that the amount of coating is increased to obtain deep frieds by thick coating. Moreover, when the resultant deep-frieds are frozen for storage and then thawed in a microwave oven, excellent soft, crispy texture is obtained.

Moreover, steamed Chinese manju prepared in accordance with the present invention have excellent texture and flavor; they maintain their soft texture even after they are stored in a refrigerator or a freezer and then thawed in a microwave oven, they never become gummy, and they have soft and moistened texture.

Also, the dough-sheet-wrapped foods prepared in accordance with the present invention do not have tough texture when consumed after being stored in a refrigerator or a freezer.

When the flour blend of the present invention is used, the viscosity of the batter is increased. Consequently, the batter maintains its solidity during baking, so that volume-rich okonomiyaki and takoyaki can be prepared. In addition, the resultant okonomiyaki and takoyaki provide agreeable resistance to the teeth, and have moistened texture and proper viscoelasticity.

BEST MODES FOR CARRYING OUT THE INVENTION

In the present invention, the term "waxy wheat flour" refers to wheat flour having an amylose content of not more than 10%. An example of waxy wheat is one created by the two inventors of the present invention and described in Japanese Patent Application Laid-Open (kokai) No. 6-125669, which has an amylose content of 0%. This waxy wheat is created according to the method described in that publication. Briefly, a hexaploid wheat which lacks Wx-A1 protein and the Wx-B1 protein but maintains Wx-D1 protein is crossed with a hexaploid wheat which lacks only Wx-D1 protein, to thereby obtain individuals of the first filial generation. The thus-obtained individuals are self-fertilized to obtain individuals of the second filial generation, from which those lacking the above-mentioned three types of proteins are selected. Alternatively, the waxy wheat may be created by crossing a hexaploid which lacks Wx-A1 protein and Wx-B1 protein among the three types of proteins with an individual of tetraploid wheat (genomic constitution: AABB). The entire contents of Japanese Patent Application Laid-Open (kokai) No. 6-125669 are incorporated herein by reference.

The above-mentioned waxy wheat is characterized in that its amylose content is 0%. When this wheat is crossed with non-waxy wheat and the resultant individuals are selected according to customary methods, it is possible to obtain waxy wheat whose amylose content is not more than The method for creating waxy wheat is not limited to that described above; waxy wheat which is suitable for the present invention may also be obtained through radioactive irradiation or chemical mutagenesis treatment. It is also possible to select the wheat species having an amylose content of not more than 10% from among species grown by use of such irradiated or chemically-treated wheat as a mother plant.

The content of waxy wheat flour in the flour blend of the present invention differs in accordance with the end use of the flour blend. Preferably, the content is between 1 and 90% by weight. The flour blend of the present invention may also contain one or more members selected from the group consisting of non-waxy wheat flour, rye flour, buckwheat flour, rice flour, barley flour, and starch. The term "non-waxy wheat flour" refers to ordinary wheat flour other than waxy wheat flour.

Of the flour blends of the present invention, those for preparing deep frieds preferably contain waxy wheat flour in an amount between 1 and 80% by weight, more preferably between 2 and 70% by weight. In the category of flour blends for preparing deep frieds, no particular limitation is imposed on the identity of the flours other than the waxy flour, and thus, hard, semi-hard, or soft non-waxy wheat flour; rye flour; starch; etc. may be incorporated. If the content of waxy wheat flour in the flour blend for deep frieds is less than 1% by weight, effects of the present invention cannot be fully obtained. On the other hand, if the content is in excess of 80% by weight, the resultant deep frieds may become rather tough or excessively moistened.

Of the flour blends of the present invention, those for preparing steamed Chinese manju preferably contain waxy wheat flour in an amount between 1 and 80% by weight, more preferably between 10 and 70% by weight, with the remaining parts being non-waxy wheat flour, rice flour, starch, etc. If the content of waxy wheat flour in the flour blend for preparing steamed Chinese manju is less than 1% by weight, preventive effects against becoming tough are insufficient. On the other hand, if the content is in excess of 80% by weight, the viscoelasticity becomes excessively strong, which may provide a texture different from that of commonly accepted steamed Chinese manju.

Of the flour blends of the present invention, those for preparing dough sheets preferably contain waxy wheat flour in an amount between 10 and 90% by weight, more preferably between 30 and 70% by weight, with the remaining parts being non-waxy wheat flour, rice flour, starch, etc. If the content of waxy wheat flour in the flour blend for dough sheets is less than 10% by weight, preventive effects against becoming tough are insufficient. On the other hand, if the content is in excess of 90% by weight, the viscoelasticity becomes excessively strong, which may provide a texture different from that of commonly accepted dough-sheet-wrapped foods.

The flour blends for preparing okonomiyaki and takoyaki preferably contain the abovementioned waxy wheat flour in an amount between 1 and 50% by weight, more preferably between 5 and 30% by weight. No particular limitation is imposed on the identity of the flours other than the waxy flour, and thus, hard, semi-hard, or soft non-waxy wheat flour; rye flour; starch; etc. may be incorporated. If the content of waxy wheat flour in the flour blend is less than 1% by weight, effects of the present invention cannot be fully obtained. On the other hand, if the content is in excess of 50% by weight, the resultant food products may come to have excessive elasticity.

The flour blend of the present invention may be obtained by manufacturing (or milling) waxy wheat flour and other flours separately and then blending the resultant flours. Alternatively, waxy wheat and other cereal grains may be blended and then milled.

The deep frieds of the present invention are prepared by use of customary methods and apparatus, except that a flour blend containing the abovementioned waxy wheat flour is used as the flour. For example, the deep frieds of the present invention are prepared as follows. A batter is prepared by adding, to a flour blend for deep frieds, auxiliary ingredients used in the preparation of deep frieds, including salt, flavors, baking powder, egg, water, and if desired, spices, and then mixing. The resultant batter is applied to vegetables, meat, fish, shellfish, etc., followed by deep frying. In addition to the above-mentioned auxiliary ingredients, other additives such as vitamins and minerals may also be incorporated as desired.

The steamed Chinese manju of the present invention are prepared by customary methods except that a flour blend containing the abovementioned waxy wheat flour is used as the flour.

The okonomiyaki and takoyaki of the present invention are prepared by customary methods and apparatus, except that a flour blend containing the abovementioned waxy wheat flour is used as the flour. For example, the okonomiyaki of the present invention are prepared by adding, to a flour blend for okonomiyaki, auxiliary ingredients used in the preparation of okonomiyaki, including salt, flavors, baking powder, egg, water, and if desired, spices, sugar and fish powder, then mixing and baking. The takoyaki of the present invention is prepared in a manner similar to that for the preparation of okonomiyaki, except that pieces of octopus are added and the octopus-containing batter is baked in a special pan into ball-shaped products. In addition to the above-mentioned auxiliary ingredients, the okonomiyaki and takoyaki of the present invention may include other additives such as meat, fish, shellfish, vegetables, vitamins, minerals, etc.

EXAMPLES

The present invention will next be described by way of examples, which should not be construed as limiting the invention.

Hereinafter, "%" indicates % by weight.

Example 1 Deep fried (Kara-age):

Kara-age is a deep fried of chicken or potato etc.

The flour blends shown in Table 1 and the ingredients shown in Table 2 were used to prepare kara-age in accordance with the below-described process.

TABLE 1

| Test No. | Waxy wheat flour (%) | Soft wheat flour* (%) | Waxy rice flour (%) | Waxy cornstarch (%) |
|---|---|---|---|---|
| 1 | 0.5 | 99.5 | — | — |
| 2 | 1 | 99 | — | — |
| 3 | 2 | 98 | — | — |
| 4 | 5 | 95 | — | — |

TABLE 1-continued

| Test No. | Waxy wheat flour (%) | Soft wheat flour* (%) | Waxy rice flour (%) | Waxy cornstarch (%) |
|---|---|---|---|---|
| 5 | 10 | 90 | — | — |
| 6 | 30 | 70 | — | — |
| 7 | 50 | 50 | — | — |
| 8 | 70 | 30 | — | — |
| 9 | 80 | 20 | — | — |
| 10 | 100 | — | — | — |
| 11 | 0 | 100 | — | — |
| 12 | 0 | 70 | 30 | — |
| 13 | 0 | 70 | — | 30 |

*100% Western White Wheat produced in the U.S.A. ("Flower" produced by Nisshin Flour Milling Co., Ltd.; amylose content: 30%)

TABLE 2

| Materials | |
|---|---|
| Flours other than waxy wheat flour (see Table 1) | X g |
| Waxy wheat flour (see Table 1)(Amylose content: 0%) | (100-X) g |
| Salt | 7 g |
| Flavoring matter | 1 g |
| Baking powder | 3 g |
| Spices | 10 g |
| Water | 120 g |
| Chicken dark meat | Suitable amount |

Process for preparing kara-age:

(1) Mixing: The above-listed ingredients other than chicken dark meat were mixed using a whisk or a similar utensil, to thereby obtain a homogeneous batter.

(2) Deep frying: The meat was divided into pieces (25 g), passed through the batter obtained in step (1), and deep-fried in 180° C. oil for 3 minutes.

The thus-prepared kara-age were stored in a freezer of −20° C. for 3 days, and subsequently thawed for 5 minutes in a microwave oven (600 W). The kara-age were then evaluated by 10 panelists in terms of their flavor and texture in accordance with the evaluation criteria shown in Table 3. The results are shown in Table 4 in terms of average ratings. The viscosity of the batter and the amounts of batter attached to the meat are shown in Table 5.

The viscosity was measured by use of a B-type viscometer.

TABLE 3

| Evaluation criteria |
|---|
| Flavor |

Taste:

5: Excellent taste with rich flavor
4: Fair taste and flavor
3: Moderate taste and flavor
2: Very slight taste and flavor
1: No taste and no flavor Smell:

5: Excellent
4: Good
3: Fair
2: Slightly poor
1: Poor

TABLE 3-continued

| Evaluation criteria |
|---|
| Texture |

Touch to the teeth:

5: Very crispy
4: Fairly crispy
3: Slightly crispy
2: Slightly elastic and gummy
1: Very elastic and gummy Juiciness of meat 5: Very juicy
4: Fairly juicy
3: Slightly juicy
2: Slightly rough and dry texture
1: Rough and dry texture

TABLE 4

| | After being thawed | | | |
|---|---|---|---|---|
| | Flavor | | Texture | |
| Test No. | Taste | Smell | Touch to the teeth | Juiciness of the meat |
| 1 | 4.1 | 4.2 | 2.9 | 2.7 |
| 2 | 4.6 | 4.5 | 3.9 | 3.9 |
| 3 | 4.6 | 4.4 | 4.5 | 4.6 |
| 4 | 4.7 | 4.6 | 4.5 | 4.7 |
| 5 | 4.5 | 4.5 | 4.5 | 4.6 |
| 6 | 4.4 | 4.7 | 4.6 | 4.8 |
| 7 | 4.5 | 4.6 | 4.8 | 4.9 |
| 8 | 4.5 | 4.5 | 4.5 | 4.5 |
| 9 | 3.9 | 3.8 | 4.3 | 4.2 |
| 10 | 3.1 | 3.0 | 2.9 | 3.1 |
| 11 | 4.3 | 4.2 | 2.7 | 2.9 |
| 12 | 3.2 | 3.3 | 3.0 | 2.9 |
| 13 | 2.9 | 2.8 | 2.9 | 2.9 |

TABLE 5

| Test No. | Viscosity of batter (cps) | Amount of batter attached (g/100 g of meat) |
|---|---|---|
| 1 | 1950 | 32 |
| 2 | 2050 | 40 |
| 3 | 2250 | 41 |
| 4 | 2400 | 44 |
| 5 | 2600 | 46 |
| 6 | 2850 | 48 |
| 7 | 3000 | 50 |
| 8 | 3100 | 53 |
| 9 | 3250 | 54 |
| 10 | 3600 | 60 |
| 11 | 1850 | 30 |
| 12 | 1800 | 30 |
| 13 | 1500 | 27 |

From Tables 4 and 5 above, it is clear that the kara-age of the present invention prepared by use of a flour blend containing waxy wheat flour had excellent texture after freezing and thawing, with the flavor peculiar to kara-age being maintained, as compared with kara-age prepared by use of ordinary wheat flour. Also, it is noted that the kara-age of the present invention are voluminous, because enhanced viscosities of the batter permits greater amounts of coating to adhere. However, when the proportion of waxy wheat flour to the flour blend was in excess of 80%, the resultant kara-age had slightly tough texture.

Example 2 Deep fried (Tempura):

The flour blends shown in Table 1 above and the ingredients shown in Table 6 were used to prepare tempura in accordance with the below-described process.

TABLE 6

| Materials | |
| --- | --- |
| Flours other than waxy wheat flour (see Table 1) | X g |
| Waxy wheat flour (see Table 1)(Amylose content: 0%) | (100-X) g |
| Salt | 1 g |
| Baking powder | 3 g |
| Water | 170 g |
| Shrimp (Black tiger) | Suitable amount |

Process for the preparation:

(1) All the ingredients other than shrimp were mixed.

(2) The shrimp were cleaned, passed through the batter obtained in step (1), and deep-fried in 170° C. oil for 3 minutes.

The thus-prepared tempura were stored in a freezer (−20° C.) for 3 days, and subsequently thawed for 5 minutes in a microwave oven (600 W). The tempura were then evaluated by 10 panelists in terms of their flavor and texture in a manner similar to that in Example 1. The results are shown in Table 7 in terms of average ratings. The viscosity of the batter and the amounts of batter attached to the meat are shown in Table 8.

TABLE 7

| | After being thawed | | |
| --- | --- | --- | --- |
| | Flavor | | Texture |
| Test No. | Taste | Smell | Touch to the teeth | Juiciness of the shrimp |
| 1 | 4.2 | 4.1 | 2.9 | 3.0 |
| 2 | 4.7 | 4.6 | 3.8 | 3.7 |
| 3 | 4.6 | 4.7 | 4.6 | 4.6 |
| 4 | 4.8 | 4.5 | 4.8 | 4.5 |
| 5 | 4.8 | 4.8 | 4.7 | 4.6 |
| 6 | 4.8 | 4.8 | 4.6 | 4.7 |
| 7 | 4.6 | 4.6 | 4.8 | 4.8 |
| 8 | 4.5 | 4.6 | 4.5 | 4.5 |
| 9 | 4.5 | 4.4 | 3.2 | 3.9 |
| 10 | 3.9 | 3.8 | 2.9 | 2.9 |
| 11 | 3.1 | 3.2 | 2.8 | 2.7 |
| 12 | 3.0 | 3.1 | 2.7 | 2.6 |
| 13 | 2.8 | 2.7 | 2.9 | 2.8 |

TABLE 8

| Test No. | Viscosity of batter (cps) | Amount of batter attached (g/100 g of shrimp) |
| --- | --- | --- |
| 1 | 1090 | 40 |
| 2 | 2100 | 49 |
| 3 | 2250 | 50 |
| 4 | 2350 | 53 |
| 5 | 2500 | 58 |
| 6 | 2600 | 61 |
| 7 | 2650 | 72 |
| 8 | 2700 | 77 |
| 9 | 2750 | 80 |
| 10 | 3050 | 90 |
| 11 | 1000 | 38 |

TABLE 8-continued

| Test No. | Viscosity of batter (cps) | Amount of batter attached (g/100 g of shrimp) |
| --- | --- | --- |
| 12 | 1000 | 39 |
| 13 | 950 | 36 |

From Tables 7 and 8 above, it is clear that the tempura of the present invention prepared by use of a flour blend containing waxy wheat flour had excellent texture after freezing and thawing, with the flavor peculiar to tempura being maintained, as compared with tempura prepared by use of wheat flour containing waxy rice flour or waxy cornstarch or wheat flour containing ordinary wheat flour. Also, it is noted that the tempura of the present invention are voluminous, because enhanced viscosities of the batter permits greater amounts of coating to adhere. However, when the proportion of waxy wheat flour to the flour blend was in excess of 80%, the resultant tempura became oily due to increased amounts of absorbed oil.

Example 3: Steamed Chinese manju (an-man)

The below-indicated flour blends were used to prepare an-man (Chinese manju filled with bean jam) in accordance with the process described below. The proportions of waxy wheat flour (amylose content 0%) and other flours are shown in Table 11. The commercially obtained wheat flour used in this Example consisted of 40 parts by weight of hard wheat flour ("Camellia" by Nisshin Flour Milling Co., Ltd.; amylose content: 30%) and 60 parts by weight of soft wheat flour ("Violet" by Nisshin Flour Milling Co., Ltd.; amylose content: 31%), both being available from the market.

TABLE 9

| Materials | |
| --- | --- |
| Flour other than the waxy wheat flour | X parts by weight |
| Waxy wheat flour (obtained in Ex. 2 of JP-A-6-125669) | (100-X) parts by weight |
| Sugar | 12 parts by weight |
| Shortening | 5 parts by weight |
| Yeast | 2 parts by weight |
| Baking powder | 1 parts by weight |
| Salt | 1 parts by weight |
| Water | 47 parts by weight |

TABLE 10

Process for the preparation of an-man:

Mixing:
 The above-listed ingredients were put in a mixer and mixed for 2 minutes at low speed, 2 minutes at medium-low speed, and then 6 minutes at medium-high speed (mixing temperature: 27° C.).
Fermentation:
 After forty-five (45) minutes of fermentation (temperature: 27° C., humidity: 70%), the dough was processed in a punching machine for 1 minute.
Cutting: 45 g/piece
Bench time: 10 minutes
Forming: Forty (40) grams of bean jam (an) was wrapped in a piece of Chinese manju coating.
Proofer: Thirty (30) minutes (Temperature: 45° C., Humidity: 60%)
Steaming: Ten (10) minutes (0.5 atm)
Cooling: Twenty (20) minutes (room temperature)
Freezing: One (1) hour in a shock freezer (−40° C.)

TABLE 10-continued

Process for the preparation of an-man:

Packaging: Packaged with a plastic sheet
Storage: Freezer (−18° C.)

When 10 days had elapsed after the an-man were prepared and stored as described above, the an-man were cooked by the application of heat in a microwave oven (500 W) for 90 seconds.

The cooked an-man were subjected to sensory evaluation by 10 skilled panelists in accordance with the evaluation criteria shown in Table 12.

In Comparative Examples (Test Nos. 12–15) were employed the abovementioned commercially available wheat flour, or a flour containing the commercially available wheat flour and one of waxy rice flour, waxy cornstarch, or tapioca starch at proportions shown in Table 11. The process used in the Comparative Examples was the same as that described above.

The waxy wheat flour used in this Example had undergone the following treatment before being subjected to the test: So as to achieve a moisture content of 14.5%, tempering in a plastic bag overnight so, and milling with a Buehler experimental mill (yield 60%, moisture content 14.5%, ash content 0.44%, and crude protein content 13.6%).

The results of the sensory test are shown in Table 13.

TABLE 11

| Test No. | Waxy wheat flour (%) | Commercially obtained wheat flour (%) | Tapioca starch (%) | Waxy rice flour (%) | Waxy cornstarch (%) |
|---|---|---|---|---|---|
| 1 | 0.5 | 99.5 | — | — | — |
| 2 | 1 | 99 | — | — | — |
| 3 | 2 | 98 | — | — | — |
| 4 | 5 | 95 | — | — | — |
| 5 | 10 | 90 | — | — | — |
| 6 | 20 | 80 | — | — | — |
| 7 | 40 | 60 | — | — | — |
| 8 | 60 | 40 | — | — | — |
| 9 | 70 | 30 | — | — | — |
| 10 | 80 | 20 | — | — | — |
| 11 | 90 | 10 | — | — | — |
| 12 | 0 | 100 | — | — | — |
| 13 | 0 | 85 | 15 | — | — |
| 14 | 0 | 85 | — | 15 | — |
| 15 | 0 | 85 | — | — | 15 |

TABLE 12

Taste

3: More favorable taste as compared with the Chinese manju of Test No. 12
2: Comparable to the taste of Test No. 12
1: Strange, disagreeable taste as compared with the Chinese manju of Test No. 12

Flavor

3: Comparable to the flavor of Test No. 12
2: A slight strange flavor as compared with the flavor of Test No. 12
1: Strange flavor (flavor of minor cereals or starch) as compared with the flavor of Test No. 12

TABLE 12-continued

Texture

Hardness

5: Clearly soft and light touch to the teeth as compared with the Chinese manju of Test No. 12
4: Moderately soft and light touch to the teeth as compared with the Chinese manju of Text No. 12
3: Comparable to the hardness of Test No. 12
2: Slightly harder and heavier touch to the teeth as compared with the Chinese manju of Test No. 12
1: Clearly hard and heavy touch to the teeth as compared with the Chinese manju of Test No. 12

Ease of crumbling in the mouth

5: Clearly moistened and viscoelastic as compared with the Chinese manju of Test No. 12
4: Moderately moistened and viscoelastic as compared with the Chinese manju of Text No. 12
3: Comparable to that of Test No. 12
2: Slightly rough and dry as compared with the Chinese manju of Test No. 12
1: Clearly rough dry as compared with the Chinese manju of Test No. 12

TABLE 13

Results of Sensory Evaluation

| | | | Texture | |
|---|---|---|---|---|
| Test No. | Taste | Flavor | Hardness | Ease of crumbling in the mouth |
| 1 | 2.1 | 3.0 | 3.0 | 3.0 |
| 2 | 2.2 | 3.0 | 3.3 | 3.2 |
| 3 | 2.2 | 3.0 | 3.5 | 3.3 |
| 4 | 2.2 | 3.0 | 3.9 | 3.5 |
| 5 | 2.3 | 3.0 | 4.1 | 3.8 |
| 6 | 2.3 | 3.0 | 4.2 | 4.0 |
| 7 | 2.4 | 3.0 | 4.4 | 4.2 |
| 8 | 2.3 | 3.0 | 4.4 | 4.3 |
| 9 | 2.2 | 3.0 | 4.5 | 4.3 |
| 10 | 2.1 | 3.0 | 4.8 | 4.4 |
| 11 | 2.2 | 3.0 | 5.0 | 4.5 |
| 12 | 2.0 | 3.0 | 3.0 | 3.0 |
| 13 | 1.2 | 1.4 | 3.5 | 3.5 |
| 14 | 1.7 | 2.1 | 4.0 | 3.6 |
| 15 | 1.5 | 1.7 | 3.4 | 3.3 |

From the above results, it was found that, when added in a suitable amount, waxy wheat flour noticeably improves the texture of foods. Different from the cases in which grain flours of different origins or starch derived therefrom is added, increased amounts of waxy wheat flour can be added without causing degradation of taste or flavor. However, when waxy wheat flour was added in amounts of not less than 90% by weight, the texture of the resultant an-man became different from that of conventional an-man and was not agreeable.

Example 4: Steamed Chinese manju (brown sugar manju)

The below-indicated flour blends were used to prepare brown sugar Chinese manju in accordance with the process described below. The proportions of waxy wheat flour (amylose content 0%) and other flours are shown in Table 11. The commercially obtained wheat flour added in this Example consisted of 80 parts by weight of hard wheat flour ("Asahi" by Nisshin Flour Milling Co., Ltd.; amylose content: 31%) and 20 parts by weight of hard wheat flour ("Camellia" by Nisshin Flour Milling Co., Ltd.; amylose content: 30%), both being available from the market.

TABLE 14

| Materials | |
|---|---|
| Flour other than waxy wheat flour | X parts by weight |
| Waxy wheat flour (obtained in Ex. 2 of JP-A-6-125669) | (100-X) parts by weight |
| Brown sugar syrup | 95 parts by weight |
| Baking soda | 2 parts by weight |
| * Formulation of brown sugar syrup: | |
| Brown sugar | 70 parts by weight |
| Water | 30 parts by weight |
| Caramel | 0.2 parts by weight |
| Baking soda | 0.1 parts by weight |

All the ingredients other than baking soda were placed in a mixing bowl, and heated to a boil by the application of low heat. Subsequently, baking soda was added in 3–4 divided portions.

TABLE 15

| Process for the preparation | |
|---|---|
| Mixing: | The above-listed ingredients were put in a mixer and mixed for 2 minutes at low speed and 1 minute at medium speed (mixing temperature: 25° C.). |
| Maturing of the dough: | Thirty (30) minutes |
| Cutting: | 10 g/piece |
| Forming: | Twenty (20) grams of bean jam (an) was wrapped in a piece of Chinese manju coating. |
| Steaming: | Seven (7) minutes (0.5 atm) |
| Cooling: | Twenty (20) minutes (room temperature) |
| Freezing: | One (1) hour in a shock freezer (−40° C.) |
| Packaging: | Packaged with a plastic sheet |
| Storage: | Freezer (−18° C.) |

When 10 days had elapsed after the brown sugar Chinese manju were prepared and stored as described above, the Chinese manju were cooked by the application of heat in a microwave oven (500 W) for 90 seconds.

The cooked brown sugar Chinese manju were subjected to sensory evaluation by 10 skilled panelists in accordance with the evaluation criteria shown in Table 12.

In Comparative Examples (Test Nos. 12–15) were employed the abovementioned commercially available wheat flour, or a flour containing the commercially available wheat flour and one of waxy rice flour, waxy cornstarch, or tapioca starch at proportions shown in Table 11. The process used in the Comparative Examples was the same as that described above.

The results of sensory evaluation are shown in Table 16.

TABLE 16

| | Results of sensory evaluation | | | |
|---|---|---|---|---|
| | | | Texture | |
| Test No. | Taste | Flavor | Hardness | Ease of crumbling in the mouth |
| 1 | 2.1 | 3.0 | 3.0 | 3.0 |
| 2 | 2.2 | 3.0 | 3.3 | 3.1 |
| 3 | 2.1 | 3.0 | 3.4 | 3.1 |
| 4 | 2.2 | 3.0 | 3.7 | 3.3 |
| 5 | 2.3 | 3.0 | 3.9 | 3.6 |
| 6 | 2.4 | 3.0 | 4.1 | 3.9 |
| 7 | 2.4 | 3.0 | 4.3 | 4.1 |
| 8 | 2.3 | 3.0 | 4.4 | 4.3 |
| 9 | 2.4 | 3.0 | 4.5 | 4.3 |
| 10 | 2.2 | 3.0 | 4.6 | 4.3 |
| 11 | 2.2 | 3.0 | 4.8 | 4.4 |
| 12 | 2.0 | 3.0 | 3.0 | 3.0 |
| 13 | 1.5 | 1.7 | 3.5 | 3.3 |
| 14 | 1.8 | 2.2 | 4.0 | 3.5 |
| 15 | 1.4 | 1.9 | 3.4 | 3.2 |

The results of evaluation by 10 skilled panelists confirmed that the addition of waxy wheat flour was also effective in the case of brown sugar Chinese manju.

Example 5: Dough Sheets (gyoza)

The raw material having a formulation described below was used to obtain gyoza. Flour blends were prepared by adding, to a commercially available wheat flour ("Toku-Number One," by Nisshin Flour Milling Co., Ltd.; moisture content 13.7–15.1%, ash content 0.31–0.37%, crude protein content 10.8–11.6%, and amylose content 33%), the waxy wheat flour (amylose content 0%) obtained in Example 2 of Japanese Patent Application Laid-Open (kokai) No. 6-125669 in the proportions as shown in Table 17. To 100 parts by weight of each of the resultant flour blends was added a NaCl solution prepared by adding 1 part by weight of NaCl to 36 parts by weight of water. The mixture was mixed for 10 minutes to thereby obtain a crumbly dough. The dough was made into sheets by use of noodle-making rolls provided with a roll clearance of 3.2 mm. The dough sheets were matured for 2 hours in a plastic bag. Thereafter, the sheets were rolled between noodle-making rolls to thereby obtain sheets having a thickness of about 1.0 mm. The sheets were cut into round pieces by the use of a round cutter (diameter: 8 cm), to thereby obtain raw pasta wrapping for gyoza. The raw pasta wrapping for gyoza were shaped to contain 12 g of a mixture of meat and vegetables, and then steamed for 8 minutes at 0.5 atm. Immediately thereafter, the gyoza were rapidly frozen, and then stored for 10 days at −20° C. The thus-frozen gyoza were cooked using a frying pan.

The cooked gyoza were subjected to sensory evaluation performed by 10 skilled panelists. The evaluation criteria are shown in Table 18.

For comparison, the above-described commercially available wheat flour or the flour samples obtained by blending the above-described commercially available wheat flour and any of waxy rice flour, waxy cornstarch, or tapioca starch in proportions shown in Table 17 were used to prepare gyoza in a manner similar to that described above (Test Nos. 12–15).

The waxy wheat flour used in the test had undergone the following treatment before being subjected to the test: So as to achieve a moisture content of 14.5%, tempering in a plastic bag, and milling with a Buehler experimental mill (yield 60%, moisture content 14.5%, ash content 0.44%, and crude protein content 13.6%).

The results of the sensory test are shown in Table 19.

TABLE 17

| Test No. | Waxy wheat flour (%) | Commercially obtained wheat flour (%) | Tapioca starch (%) | Waxy rice flour (%) | Waxy cornstarch (%) |
|---|---|---|---|---|---|
| 1 | 5 | 95 | — | — | — |
| 2 | 10 | 90 | — | — | — |
| 3 | 20 | 80 | — | — | — |
| 4 | 30 | 70 | — | — | — |
| 5 | 40 | 60 | — | — | — |
| 6 | 50 | 50 | — | — | — |
| 7 | 60 | 40 | — | — | — |
| 8 | 70 | 30 | — | — | — |
| 9 | 80 | 20 | — | — | — |
| 10 | 90 | 10 | — | — | — |
| 11 | 100 | 0 | — | — | — |
| 12 | 0 | 100 | — | — | — |
| 13 | 0 | 80 | 20 | — | — |
| 14 | 0 | 80 | — | 20 | — |
| 15 | 0 | 80 | — | — | 20 |

TABLE 18

Evaluation criteria

Taste

3: More favorable taste as compared with the dough sheets of Test No. 12
2: Comparable to the taste of Test No. 12 dough sheets
1: Strange, disagreeable taste as compared with the dough sheet of Test No. 12

Texture

Hardness

5: Clearly soft touch to the teeth as compared with the dough sheets of Test No. 12
4: Moderately soft touch to the teeth as compared with the dough sheets of Text No. 12
3: Comparable to the hardness of Test No. 12 dough sheets
2: Slightly harder touch to the teeth as compared to the dough sheets of Test No. 12
1: Clearly hard touch to the teeth as compared with the dough sheets of Test No. 12

Viscoelasticity

5: Clearly viscoelastic as compared with the dough sheets of Test No. 12
4: Slightly more viscoelastic as compared with the dough sheets of Text No. 12
3: Comparable to Test No. 12 dough sheets
2: Less viscoelastic and slightly crumbling touch to the teeth as compared with the dough sheets of Test No. 12
1: No viscoelasticity, and very crumbling touch to the teeth as compared with the dough sheets of Test No. 12

TABLE 19

| | Results of sensory evaluation | | |
|---|---|---|---|
| | | Texture | |
| Test No. | Taste | Hardness | Visco-elasticity |
| 1 | 2.1 | 3.2 | 3.4 |
| 2 | 2.1 | 3.5 | 3.5 |
| 3 | 2.2 | 3.7 | 3.7 |
| 4 | 2.3 | 3.8 | 3.8 |
| 5 | 2.4 | 3.9 | 4.0 |
| 6 | 2.4 | 4.0 | 4.1 |
| 7 | 2.3 | 4.2 | 4.2 |
| 8 | 2.3 | 4.2 | 4.3 |
| 9 | 2.2 | 4.4 | 4.6 |
| 10 | 2.1 | 4.6 | 4.7 |
| 11 | 2.1 | 5.0 | 5.0 |
| 12 | 2.0 | 3.0 | 3.0 |
| 13 | 1.3 | 3.8 | 3.9 |
| 14 | 1.5 | 3.7 | 3.4 |
| 15 | 1.2 | 3.6 | 4.0 |

From the above results, it was found that, when added in a suitable amount, waxy wheat flour noticeably improves the texture of foods. Different from the cases in which grain flours of different origins or starch derived therefrom is added, increased amounts of waxy wheat flour can be added without causing degradation of taste or flavor. However, when waxy wheat flour was used in amounts of 100% by weight, the texture of the resultant gyoza became different from that of conventional gyoza and therefore was not agreeable.

Example 6 Dough Sheets (Shumai):

Flour blends were prepared by adding, to a commercially available wheat flour (same as that used in Example 5), the waxy wheat flour (amylose content 0%) obtained in Example 2 of Japanese Patent Application Laid-Open (kokai) No. 6-125669 in the proportions as shown in Table 17. To 100 parts by weight of each of the resultant flour blends was added a NaCl solution prepared by adding 1 part by weight of NaCl to 36 parts by weight of water. The mixture was mixed for 10 minutes to thereby obtain a crumbly dough. The dough was made into sheets by use of noodle-making rolls provided with a roll clearance of 3.2 mm. The dough sheets were matured for 2 hours in a plastic bag. Thereafter, the sheets were rolled between noodle-making rolls to thereby obtain sheets having a thickness of about 0.5 mm. The sheets were cut into square pieces (7 cm ×7 cm), to thereby obtain raw pasta wrapping for shumai. The raw pasta wrapping for shumai were shaped to contain 18 g of a mixture of meat and vegetables, and then steamed for 8 minutes at 0.5 atm. Immediately thereafter, the shumai were rapidly frozen, and then stored for 10 days at −20° C. The thus-frozen shumai were cooked using a steamer.

The cooked shumai were subjected to sensory evaluation performed by 10 skilled panelists. The evaluation criteria are shown in Table 18.

For comparison, the above-described commercially available wheat flour or the flour samples obtained by blending the above-described commercially available wheat flour and any of waxy rice flour, waxy cornstarch, or tapioca starch in proportions shown in Table 17 were used to prepare shumai in a manner similar to that described above (Test Nos. 12–15).

The results of the sensory test are shown in Table 20.

TABLE 20

Results of sensory evaluation

| Test No. | Taste | Texture Hardness | Visco-elasticity |
|---|---|---|---|
| 1 | 2.1 | 2.5 | 3.4 |
| 2 | 2.2 | 2.3 | 3.6 |
| 3 | 2.2 | 2.3 | 3.7 |
| 4 | 2.4 | 2.1 | 3.9 |
| 5 | 2.5 | 2.0 | 4.2 |
| 6 | 2.4 | 1.9 | 4.2 |
| 7 | 2.5 | 1.8 | 4.3 |
| 8 | 2.3 | 1.6 | 4.5 |
| 9 | 2.2 | 1.5 | 4.7 |
| 10 | 2.2 | 1.3 | 4.8 |
| 11 | 2.1 | 1.0 | 5.0 |
| 12 | 2.0 | 3.0 | 3.0 |
| 13 | 1.4 | 2.1 | 4.0 |
| 14 | 1.7 | 2.3 | 3.6 |
| 15 | 1.4 | 2.2 | 4.1 |

The results of evaluation by 10 skilled panelists confirmed that the addition of waxy wheat flour was also effective in the case of shumai. However, when waxy wheat flour was used in amounts of 100% by weight, the texture of the resultant shumai became different from that of conventional shumai and therefore was not agreeable.

Example 7 Okonomiyaki:

The flour blends shown in Table 21 and the ingredients shown in Table 22 were used to prepare okonomiyaki in accordance with the process described below.

TABLE 21

| Test No. | Waxy wheat flour (%) | Soft wheat flour* (%) | Guar gum (%) | Corn-starch (%) | Modified tapioca starch** (%) | Waxy rice flour (%) | Waxy corn-starch |
|---|---|---|---|---|---|---|---|
| 1 | 0.5 | 99.5 | — | — | — | — | — |
| 2 | 1 | 99 | — | — | — | — | — |
| 3 | 2 | 98 | — | — | — | — | — |
| 4 | 5 | 95 | — | — | — | — | — |
| 5 | 10 | 90 | — | — | — | — | — |
| 6 | 20 | 80 | — | — | — | — | — |
| 7 | 30 | 70 | — | — | — | — | — |
| 8 | 40 | 60 | — | — | — | — | — |
| 9 | 50 | 50 | — | — | — | — | — |
| 10 | 60 | 40 | — | — | — | — | — |
| 11 | 0 | 100 | — | — | — | — | — |
| 12 | 0 | 85 | 15 | — | — | — | — |
| 13 | 0 | 85 | — | 15 | — | — | — |
| 14 | 0 | 85 | — | — | 15 | — | — |
| 15 | 0 | 80 | — | — | — | 20 | — |
| 16 | 0 | 80 | — | — | — | — | 20 |

*100% Western White Wheat produced in the U.S.A. (Soft wheat flour, "Flower," produced by Nisshin Flour Milling Co., Ltd.; amylose content: 30%)
**Nisshoku MT-1 (produced in Thailand; Asia Modified Starch Co., Ltd.)

TABLE 22

| Materials | |
|---|---|
| Flour other than waxy wheat flour (see Table 21) | X g |
| Waxy wheat flour | (100-X) g |

TABLE 22-continued

| Materials | |
|---|---|
| (see Table 21)(Amylose content: 0%) | |
| Salt | 3 g |
| Flavoring matter | 1 g |
| Baking powder | 3 g |
| Powdery soup stock (dashi) | 1 g |
| Whole egg | 60 g |
| Water | 120 g |

Process for the preparation of okonomiyaki:

(1) Mixing: The above-listed ingredients were mixed using a whisk or a similar utensil, to thereby obtain a homogeneous batter.

(2) Baking: The batter (100 g) was poured onto a hot plate or a similar pan preheated to 180° C. One side was baked for 1 minute, and then the other side was baked for 1 minute.

The resultant okonomiyaki were evaluated by 10 panelists in terms of their flavor and texture in accordance with the evaluation criteria shown in Table 23. The results are shown in Table 24. Also, the viscosity and the height of the batter are shown in Table 25. The viscosity was measured with a B-type viscometer.

TABLE 23

Evaluation criteria

Flavor

Taste:

5: Excellent taste with rich flavor
4: Fair taste and flavor
3: Moderate taste and flavor
2: Very slight taste and flavor
1: No taste and no flavor Smell:

5: Excellent
4: Good
3: Fair
2: Slightly poor
1: Poor

Texture

Moistness:

5: Very moist texture
4: Fairly moist texture
3: Slightly moist texture
2: Slightly dry texture
1: Clearly dry texture Resistance to the teeth 5: Very viscoelastic and chewy
4: Fairly viscoelastic and chewy
3: Slightly viscoelastic and chewy
2: Moderately crumbling and lack of resistance to the teeth
1: Clearly crumbling and lack of resistance to the teeth

TABLE 24

| | After preparation | | | |
|---|---|---|---|---|
| | Flavor | | | Texture |
| Test No. | Taste | Smell | Moistness | Resistance to the teeth |
| 1 | 4.2 | 4.2 | 2.9 | 2.8 |
| 2 | 4.6 | 4.5 | 3.8 | 3.9 |
| 3 | 4.6 | 4.4 | 4.2 | 4.4 |
| 4 | 4.7 | 4.6 | 4.5 | 4.7 |
| 5 | 4.5 | 4.5 | 4.5 | 4.6 |
| 6 | 4.5 | 4.7 | 4.6 | 4.8 |
| 7 | 4.5 | 4.5 | 4.8 | 4.9 |
| 8 | 3.7 | 3.9 | 3.8 | 3.6 |
| 9 | 3.4 | 3.3 | 3.7 | 3.5 |
| 10 | 2.8 | 2.9 | 3.2 | 3.1 |
| 11 | 4.0 | 4.0 | 2.7 | 2.9 |
| 12 | 2.9 | 2.5 | 3.2 | 2.7 |
| 13 | 3.2 | 2.7 | 2.5 | 2.8 |
| 14 | 2.7 | 3.1 | 2.8 | 2.9 |
| 15 | 2.9 | 2.8 | 3.9 | 3.8 |
| 16 | 2.8 | 3.0 | 2.8 | 2.9 |

TABLE 25

| Test No. | Viscosity of batter (cps) | Height of batter (mm) |
|---|---|---|
| 1 | 2400 | 5 |
| 2 | 2700 | 8 |
| 3 | 2850 | 9 |
| 4 | 3100 | 10 |
| 5 | 3300 | 11 |
| 6 | 3600 | 13 |
| 7 | 3750 | 14 |
| 8 | 4050 | 15 |
| 9 | 4200 | 17 |
| 10 | 4400 | 19 |
| 11 | 2350 | 4 |
| 12 | 3150 | 12 |
| 13 | 2500 | 5 |
| 14 | 2550 | 6 |
| 15 | 2250 | 4 |
| 16 | 1600 | 3 |

From the results shown in Tables 24 and 25, it was found that okonomiyaki of the present invention in which waxy wheat flour was incorporated had excellent texture and maintained the unique flavor of okonomiyaki as compared with the okonomiyaki prepared by use of any of guar gum, cornstarch, modified tapioca starch, waxy rice flour, or waxy cornstarch. Moreover, since the viscosity of the batter is high, spreading of the batter can be prevented, to thereby make the food voluminous. However, when waxy wheat flour was used in a proportion in excess of 50%, the texture of the resultant okonomiyaki became too elastic and therefore was not preferred.

Example 8 Takoyaki:

The flour blends shown in Table 21 and the ingredients shown in Table 26 were used to prepare takoyaki in accordance with the process described below.

TABLE 26

| Materials | |
|---|---|
| Flour other than waxy wheat flour (see Table 21) | X g |
| Waxy wheat flour (see Table 21)(Amylose content: 0%) | (100-X) g |
| Salt | 3 g |
| Flavoring matter | 1 g |
| Powdery soup stock (dashi) | 3 g |
| Spices | 0.5 g |
| Whole egg | 25 g |
| Water | 300 g |
| Boiled pieces of octopus | Suitable amount |

Process for the preparation:

(1) The above-listed ingredients other than boiled pieces of octopus were mixed to prepare batter.

(2) The batter was poured into the concaves of a special takoyaki pan, and a small piece of boiled octopus was put into batter of each concave.

(3) After baking for 1 minute, the batter was inverted and baked for a further 1 minute.

The thus-prepared takoyaki were evaluated in a manner similar to that of Example 7 in terms of their flavor and texture. The results are shown in Table 27. Also, the viscosity of the batter is shown in Table 28.

TABLE 27

| | After preparation | | | |
|---|---|---|---|---|
| | Flavor | | | Texture |
| Test No. | Taste | Smell | Moistness | Resistance to the teeth |
| 1 | 4.2 | 4.1 | 2.8 | 2.7 |
| 2 | 4.6 | 4.6 | 4.1 | 3.9 |
| 3 | 4.7 | 4.8 | 4.2 | 4.0 |
| 4 | 4.8 | 4.5 | 4.6 | 4.6 |
| 5 | 4.6 | 4.6 | 4.5 | 4.7 |
| 6 | 4.6 | 4.7 | 4.7 | 4.9 |
| 7 | 4.5 | 4.5 | 4.8 | 4.9 |
| 8 | 3.9 | 4.1 | 3.8 | 3.5 |
| 9 | 3.5 | 3.8 | 3.5 | 3.4 |
| 10 | 3.0 | 2.9 | 2.9 | 2.8 |
| 11 | 4.4 | 4.1 | 2.8 | 2.2 |
| 12 | 2.5 | 2.7 | 2.4 | 2.5 |
| 13 | 3.2 | 2.5 | 2.7 | 2.9 |
| 14 | 3.0 | 3.0 | 3.1 | 2.8 |
| 15 | 2.8 | 3.0 | 3.9 | 3.7 |
| 16 | 2.6 | 3.1 | 2.7 | 2.8 |

TABLE 28

| Test No. | Viscosity of batter (cps) |
|---|---|
| 1 | 1350 |
| 2 | 1500 |
| 3 | 1600 |
| 4 | 1750 |
| 5 | 1900 |
| 6 | 2050 |
| 7 | 2100 |
| 8 | 2250 |
| 9 | 2350 |
| 10 | 2400 |
| 11 | 1300 |
| 12 | 1700 |
| 13 | 1400 |

TABLE 28-continued

| Test No. | Viscosity of batter (cps) |
|---|---|
| 14 | 1350 |
| 15 | 1200 |
| 16 | 1150 |

From the results shown in Tables 27 and 28, it is clear that the takoyaki of the present invention in which waxy wheat flour was incorporated had excellent texture and maintained the unique flavor of takoyaki as compared with the takoyaki prepared by use of any of guar gum, cornstarch, modified tapioca starch, waxy rice flour, or waxy cornstarch. However, when waxy wheat flour was used in a proportion in excess of 50%, the texture of the resultant takoyaki became too elastic and therefore was not preferred.

What is claimed is:

1. A flour blend for deep fried foods, steamed Chinese manju, dough sheets, okonomi-yaki, and takoyaki, the flour blend containing waxy wheat flour, wherein
   in the case of deep fried foods and steamed Chinese manju the content of the waxy wheat flour is between 1 and 80%,
   in the case of dough sheets the content of the waxy wheat flour is between 10 and 90%, and
   in the case of okonomi-yaki and takoyaki the content of the waxy wheat flour is between 1 and 50%; and
   wherein said waxy wheat flour is a wheat flour having an amylose content of not more than 10% by weight.

2. The flour blend according to claim 1, wherein the content of waxy wheat flour is between 30 and 70% by weight, and the flour blend is for preparing dough sheets.

3. The flour blend according to claim 1, wherein the content of waxy wheat flour is between 5 and 30% by weight, and the flour blend is for preparing okonomi-yaki or takoyaki.

4. The flour blend according to claim 1, wherein the content of waxy wheat flour is between 2 and 70% by weight, and the flour blend is for preparing deep fried foods.

5. The flour blend according to claim 1, wherein the content of waxy wheat flour is between 10 and 70% by weight, and the flour blend is for preparing steamed Chinese manju.

6. The flour blend according to claim 1, wherein the content of waxy wheat flour is between 5 and 30% by weight.

7. The flour blend according to claim 1, wherein the deep fried foods, steamed Chinese manju, dough sheets, okonomi-yaki, and takoyaki have an excellent texture and taste not only immediately after preparation, but also after storage in a refrigerator or a freezer and subsequent heating and thawing in a microwave oven.

8. The flour blend according to claim 2, wherein the dough sheets have an excellent texture and taste not only immediately after preparation, but also after storage in a refrigerator or a freezer and subsequent heating and thawing in a microwave oven.

9. The flour blend according to claim 1, wherein the okonomi-yaki and takoyaki have an excellent texture and taste not only immediately after preparation, abut also after storage in a refrigerator or a freezer and subsequent heating and thawing in a microwave oven.

10. The flour blend according to claim 4, wherein the deep fried foods have an excellent texture and taste not only immediately after preparation, but also after storage in a refrigerator or a freezer and subsequent heating and thawing in a microwave oven.

11. The flour blend according to claim 5, wherein the steamed Chinese manju has an excellent texture and taste not only immediately after preparation, but also after storage in a refrigerator or a freezer and subsequent heating and thawing in a microwave oven.

12. The flour blend according to claim 6, wherein steamed Chinese manju has an excellent texture and taste not only immediately after preparation, but also after storage in a refrigerator or a freezer and subsequent heating and thawing in a microwave oven.

13. Foods selected from the group consisting of deep fried foods, steamed Chinese manju, dough sheets, okonomi-yaki, and takoyaki which foods are prepared from a flour blend containing waxy wheat flour, wherein
   in the case of deep fried foods and steamed Chinese manju the content of the waxy wheat flour is between 1 and 80%,
   in the case of dough sheets the content of the waxy wheat flour is between 10 and 90%, and
   in the case of okonomi-yaki and takoyaki the content of the waxy wheat flour is between 1 and 50%; and
   wherein said waxy wheat flour is a wheat flour having an amylose content of not more than 10% by weight.

14. The foods according to claim 13, wherein the content of waxy wheat flour in the flour blend is between 30 and 70% by weight, and the food is dough sheets.

15. The foods according to claim 13, wherein the content of waxy wheat flour in the flour blend is between 2 and 70% by weight, and the flour blend is for preparing deep fried foods.

16. The foods according to claim 13, wherein the content of waxy wheat flour in the flour blend is between 10 and 70% by weight, and the flour blend is for preparing steamed Chinese manju.

17. The foods according to claim 13, wherein the content of waxy wheat flour in the flour blend is between 5 and 30% by weight.

18. The foods according to claim 13, wherein the deep fried foods, steamed Chinese manju, dough sheets, okonomi-yaki, and takoyaki have an excellent texture and taste not only immediately after preparation, but also after storage in a refrigerator or a freezer and subsequent heating and thawing in a microwave oven.

19. The foods according to claim 14, wherein the dough sheets have an excellent texture and taste not only immediately after preparation, but also after storage in a refrigerator or a freezer and subsequent heating and thawing in a microwave oven.

20. The foods according to claim 15, wherein the deep fried foods have an excellent texture and taste not only immediately after preparation, but also after storage in a refrigerator or a freezer and subsequent heating and thawing in a microwave oven.

21. The foods according to claim 16, wherein the steamed Chinese manju has an excellent texture and taste not only immediately after preparation, but also after storage in a refrigerator or a freezer and subsequent heating and thawing in a microwave oven.

22. The foods according to claim 17, wherein the foods have an excellent texture and taste not only immediately after preparation, but also after storage in a refrigerator or a freezer and subsequent heating and thawing in a microwave oven.

* * * * *